United States Patent
Chen et al.

(10) Patent No.: US 9,785,431 B2
(45) Date of Patent: Oct. 10, 2017

(54) DEVELOPMENT, TEST AND DEPLOYMENT OF APPLICATIONS

(71) Applicant: INTERNATIONAL BUSINESS MACHINES CORPORATION, Armonk, NY (US)

(72) Inventors: Li-Ju Chen, Taipei (TW); Jun Chang Ma, Beijing (CN); Xin Sheng Mao, Beijing (CN); Jia Tan, Beijing (CN); Bo Yang, Beijing (CN); Xing Fei Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/469,088

(22) Filed: Aug. 26, 2014

(65) Prior Publication Data

US 2015/0067642 A1  Mar. 5, 2015

(30) Foreign Application Priority Data

Aug. 29, 2013 (CN) .......................... 2013 1 0384507

(51) Int. Cl.
*G06F 9/44* (2006.01)
*G06F 9/445* (2006.01)
*G06F 11/36* (2006.01)

(52) U.S. Cl.
CPC ................ *G06F 8/71* (2013.01); *G06F 8/60* (2013.01); *G06F 9/44505* (2013.01); *G06F 11/3664* (2013.01)

(58) Field of Classification Search
CPC ...................................................... G06F 8/71
USPC ........................................................ 717/102
See application file for complete search history.

(56) References Cited

U.S. PATENT DOCUMENTS

| 5,915,112 A | * | 6/1999 | Boutcher | ............ | G06F 9/44536 |
| | | | | | 717/170 |
| 8,291,079 B1 | | 10/2012 | Colton et al. | | |
| 8,375,351 B2 | | 2/2013 | Ahadian et al. | | |
| 8,392,880 B2 | | 3/2013 | Ahadian et al. | | |
| 8,904,353 B1 | * | 12/2014 | Arguelles | ............ | G06F 11/3672 |
| | | | | | 717/124 |
| 2004/0117759 A1 | * | 6/2004 | Rippert, Jr. | ............... | G06F 8/20 |
| | | | | | 717/100 |

(Continued)

OTHER PUBLICATIONS

Martti Vasar, Satish Narayana Srirama, and Marlon Dumas. 2012. Framework for monitoring and testing web application scalability on the cloud. In Proceedings of the WICSA/ECSA 2012 Companion Volume (WICSA/ECSA '12). ACM, New York, NY, USA, 53-60.*

(Continued)

*Primary Examiner* — James D Rutten
(74) *Attorney, Agent, or Firm* — Law Office of Jim Boice

(57) ABSTRACT

A method for developing an application comprises: one or more processors selecting at least one service associated with an application; and one or more processors creating a binding between the application and the at least one service. Creating the binding is performed by generating, in association with the application, a profile for the at least one service, where the profile contains at least one parameter associated with the at least one service. One or more processors automatically instantiate the at least one parameter in the at least one service based on an environment in which the application runs.

17 Claims, 5 Drawing Sheets

(56) References Cited

U.S. PATENT DOCUMENTS

| | | | |
|---|---|---|---|
| 2005/0010896 A1* | 1/2005 | Meliksetian | G06F 17/30917 717/106 |
| 2006/0005162 A1* | 1/2006 | Tseng | G06F 8/64 717/107 |
| 2007/0162892 A1* | 7/2007 | Zenz | G06F 9/44505 717/121 |
| 2008/0065993 A1* | 3/2008 | Huang | G06F 8/71 715/745 |
| 2009/0100425 A1* | 4/2009 | Russell | G06F 9/4443 718/1 |
| 2011/0055707 A1 | 3/2011 | Kimmet | |
| 2011/0265077 A1 | 10/2011 | Collison et al. | |
| 2012/0036457 A1 | 2/2012 | Perlman et al. | |
| 2012/0047483 A1* | 2/2012 | Amit | G06F 17/30861 717/104 |
| 2012/0291006 A1 | 11/2012 | Quine | |
| 2012/0324417 A1 | 12/2012 | Somani et al. | |
| 2012/0331519 A1 | 12/2012 | Yu et al. | |
| 2013/0091557 A1* | 4/2013 | Gurrapu | H04W 4/003 726/5 |

OTHER PUBLICATIONS

Anonymous, "A Cloud-Based Way Provisioning a Latest Collaborative Development Environment", Sep. 14, 2011, pp. 1-7, IPCOM000210884D, ip.com.

Anonymous, "Method and System to adjust application deployment dynamically in heterogeneous environment for workload optimization", Nov. 20, 2012, pp. 1-11, IPCOM000223358D, IP.com.

Anonymous, "Method to Leverage Cloud Resources for Software Development", Apr. 11, 2011, pp. 1-3, IPCOM000206004D, IP.com.

* cited by examiner

DEVELOPMENT, TEST AND DEPLOYMENT OF APPLICATIONS

BACKGROUND

Embodiments of the present invention generally relate to the computer field, and more specifically, to methods and apparatuses for developing, testing, and deploying applications.

With rapid population and application of computer technologies in various fields, more and more businesses rely on a computer program or application. In a traditional application development mode, a developer would compile a business logic part of an application for example by an integrated development environment (IDE). In order to test an application under development, a tester needs to develop a corresponding test case, and establish and stet a corresponding test environment. Afterwards, in the deployment phase of an application, an operator must configure various parameters and information of a service dependent on a specific target environment.

However, with the development of a new-model computing technology such as cloud computing, the above traditional mode of application development and deployment is challenged. For example, in the above mode, a person in charge of developing, testing, and deployment must manually create a binding relationship between an application and a service required by the application, such that the application may access various resources provided by the service. Due to the increase of system complexity, such manual configuration seriously affects application development and deployment period and increases the costs. Additionally, an application needs to be migrated and configured between various different environments such as development, test, and deployment, and such migration may be completed by different teams. Repeatedly configuring an application by different persons for different various environments costs considerable human labor, materials, and time; and it lacks flexibility.

Specifically, a service associated with an application might have various parameters, for example, data source, host name, path, port number, and the like. During the development stage, since these parameters in a real running environment cannot be determined, a traditional practice is that a developer configures these parameters based on the local environment. During the subsequent testing and/or deployment stage, a corresponding person likewise needs to manually change the configuration of the service according to a different environment. The above process generally cannot be repeated and reproduced; besides, it is error-prone and inefficient. Besides, since a development team and an operating team belong to different departments, information inconsistency exists between them. Such inconsistency causes a relatively high operating risk for the system services, which may even cause a greater service loss. In some existing solutions, service configuration is solidified into a hard-coded or pre-compiled configuration file. However, such an approach lacks flexibility, which cause inconvenience to subsequent actions such as application maintenance, migration, and upgrade.

In view of the foregoing, there is a need in the art for a more efficient technical solution of developing and deploying an application.

SUMMARY

In one embodiment of the present invention, a method for developing an application comprises: one or more processors selecting at least one service associated with an application; and one or more processors creating a binding between the application and the at least one service. Creating the binding is performed by generating, in association with the application, a profile for the at least one service, where the profile contains at least one parameter associated with the at least one service. One or more processors automatically instantiate the at least one parameter in the at least one service based on an environment in which the application runs.

In one embodiment of the present invention, a method for configuring an application comprises: determining, by one or more processors, a binding between an application and at least one service, wherein said determining comprises extracting a profile for the at least one service, and wherein the profile contains at least one parameter to be instantiated that is associated with the service; automatically instantiating, by one or more processors, the at least one parameter in the profile based on an environment in which the application runs; and configuring, by one or more processors, the application based on the instantiated at least one parameter.

In one embodiment of the present invention, an apparatus for use in developing an application comprises: a service selecting hardware unit configured to select at least one service associated with the application; and a binding creating hardware unit configured to create a binding between the application and the at least one service, the creating comprising generating, in association with the application, a profile for the at least one service, the profile containing at least one parameter associated with the service, wherein the at least one parameter is automatically instantiated based on an environment in which the application runs.

BRIEF DESCRIPTION OF THE SEVERAL VIEWS OF THE DRAWINGS

The above and other objectives, features and advantages of the present invention will become more apparent through more detailed depiction of the exemplary embodiments of the present invention with reference to the accompanying drawings.

Figure 1:
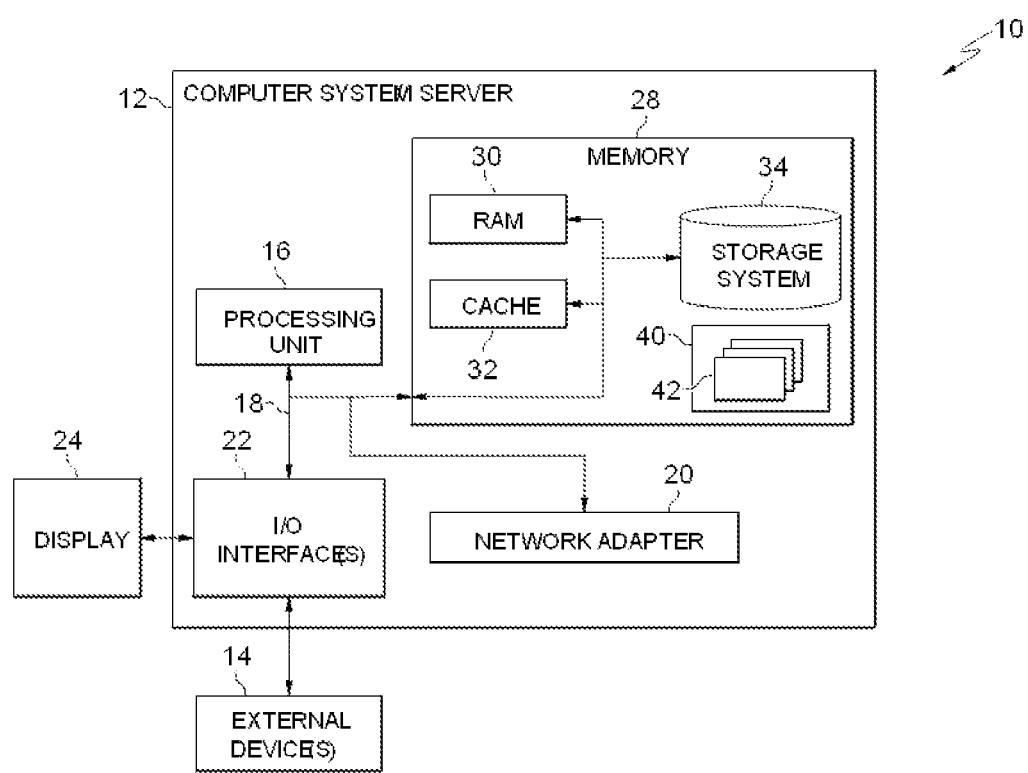
FIG. 1 shows a schematic block diagram of an exemplary computer system/server which is applicable to implement embodiments of the present invention.

Throughout the figures, the same reference refers to the same components.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Hereinafter, exemplary embodiments of the present invention will be described in detail with reference to the drawings. FIG. 1 shows an exemplary computer system/server 12 which is applicable to implement embodiments of the present invention; The computer system/server 12 as shown in FIG. 1 is only an example, which should not construct any limitation to the functions and application scope of embodiments of the present invention.

As shown in FIG. 1, the computer system/server 12 is embodied in the form of a general computing device. Components of the computer system/server 12 may comprise, but not limited to, one or more processors or processing units 16, a system memory 28, and a bus 18 connecting different system components (including the system memory 28 and the processing unit 16).

The system bus 18 indicates one or more of a plurality of bus structures, including a memory bus or a memory controller, a peripheral bus, a graphic acceleration port, a processor, or a local bus using any bus structure in the plurality of bus structures. For example, the above hierarchical structures include, but not limited to, an industrial standard architecture (ISA) bus, a MicroChannel Architecture (MAC) bus, an enhanced-ISA bus, a video electronic standard association (VESA) local bus, and a peripheral component interconnection (PCI) bus.

The computer system/server 12 typically comprises various kinds of computer system-readable mediums. These mediums may be any available mediums accessible by the computer system/server 12, comprising volatile and non-volatile mediums, mobile and non-mobile mediums.

The system memory 28 may comprise a computer system readable medium in a form of volatile memory, for example, a random access memory (RAM) 30 and/or a cache memory 32. The computer system/server 12 may further comprise other mobile/non-mobile, volatile/non-volatile computer system storage mediums. As an example, the memory system 34 may be used to read/write a non-mobile, non-volatile magnetic medium (not shown in FIG. 1, generally called "a hard disk driver"). Although not shown in FIG. 1, a magnetic disk driver for reading/writing a mobile, non-volatile magnetic disk (for example, a "floppy disk") and an optical disk driver for reading/writing a mobile, non-volatile optical disk (for example, CD-RON, DVD-RON, or other optical medium) may be provided. In these cases, each driver may be connected to the bus 18 via one or more data medium interfaces. The memory 28 may comprise at least one program product that has a set (for example, at least one) program modules, and these program modules may be configured to perform the functions of various embodiments of the present invention.

A program/utility tool 40 comprising a set (at least one) of a program module 42 may be stored in for example the memory 28; such program module 42 comprises, but not limited to, an operating system, one or more applications, other program modules, and program data, and each of these examples or a certain combination thereof might comprise implementation of a network environment. The program module 42 generally executes the functions and/or methods in the embodiments as described according to the present invention.

The computer system/server 12 may also communicate with one or more peripheral devices 14 (for example, a keypad, a pointing device, a display 24, etc.), and may also communicate with one or more device that enable the user to interact with the computer system/server 12, and/or communicate with any device (for example, network card, modem, etc.) that enables the computer system/server 12 to communicate with one or more other computing devices. Such communication may be performed via an input/output (I/O) interface 22. Moreover, the computer system/server 12 may also communicate with one or more networks (for example, a local area network (LAN), a wide area network (WAN), and/or a public network, for example, Internet). As shown in the figure, a network adaptor 20 communicates with other modules of the computer system/server 12 via the bus 18. It should be appreciated that although not shown in the figure, other hardware and/or software modules may be used in combination with the computer system/server 12, including, but not limited to, micro-code, device driver, redundancy processing unit, external disk driving array, RAID system, magnetic tape driver, and a data backup storage system, etc.

Figure 2:
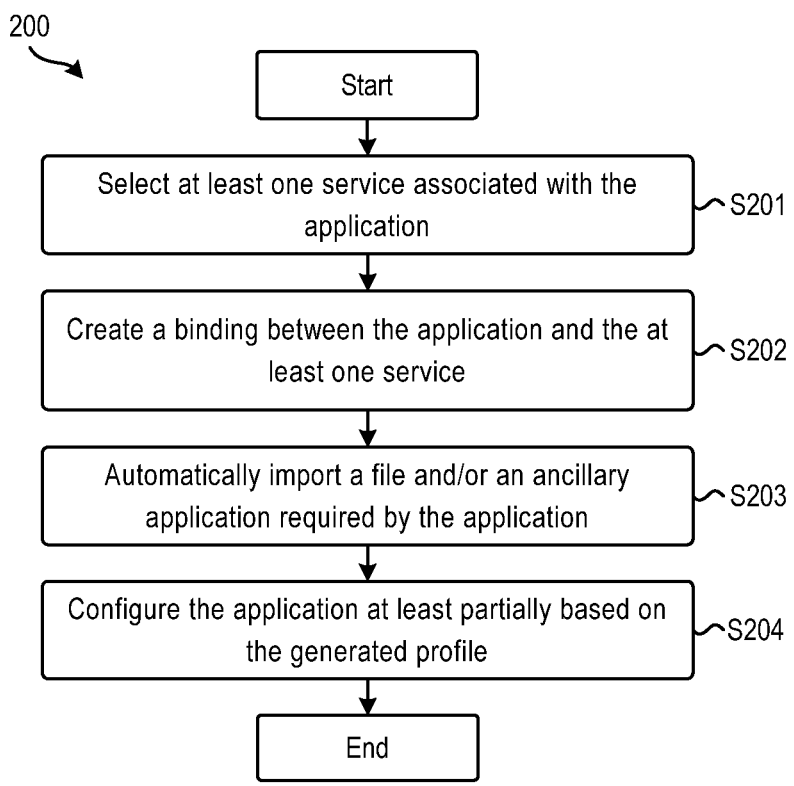
FIG. 2 shows an exemplary flow chart of a method for developing an application according to embodiments of the present invention.

Reference is now made to FIG. 2 which illustrates a flow chart of a computer-implemented method 200 for developing an application according to embodiments of the present invention. According to embodiments of the present invention, the method 200 may be executed at a developer side of an application. It should be noted that the term "application" user here includes a computer program that may run on a computer system (e.g., a computer system 12 as depicted above with reference to FIG. 1) for a particular task(s). Specifically, the application may be a local application or a cloud application.

After the method 200 starts, at step S201, at least one service associated with an application to be developed is selected. It would be appreciated that during the running process of an application, various services may have to be invoked or accessed, such as an Apache Derby database, a relation database, a JSON memory, a network service, etc. According to embodiments of the present invention, it is possible to provide a user interface available for selecting a service in an IDE for application development, for example, a graphical user interface (GUI). Through this user interface, one or more services that are likely associated with the application under development may be displayed to the user. Optionally, metadata for each service may also be displayed. The term "metadata" as used herein represents all information associated with the service. The user may select a service(s) by means of controls (such as a button, a check box, or a scroll-down list) on the user interface or directly by drag-and-drop operations. For example, the user may select a service and drag the selected service within a project window of the application so as to complete selection of the service.

Specifically, according to embodiments of the present invention, the one or more services may be pre-registered with a predefined service catalogue. Therefore, a developer of an application, a developer and/or a provider of a service may upload the metadata of the services to a dedicated server. The metadata describes information associated with the server, including, but not limited to, one or more of the following: name, version, type, mirror, client base, interface, document, exemplary code, connection configuration, and the like. Such metadata may be stored in the service catalogue of the server, and the service catalogue is refreshed.

As mentioned above, traditionally, a developer has to manually determine and add a service that is to be associated with the application. Rather, according to embodiments of the present invention, by organizing the service into a service catalogue that is accessible to the IDE, the user may conveniently, intuitively, and efficiently select a service associated with an application from the service catalogue at the application developer side. Moreover, according to some embodiments, search options may be provided to the user so as to allow the user to search a specific service(s) from the service catalogue. This facilitates improving the application development efficiency and meanwhile can lower the potential human errors during the development process.

Next, the method 200 proceeds to step S202, where a binding between the application and the selected at least one service is created. As mentioned above, traditionally, such binding has to be manually created by the developer. For example, the developer has to manually input various parameters associated with configuration of the service. In contrast, according to embodiments of the present invention, such binding between the application and the service is automatically created. Such automatic binding is beneficial since in the traditional manual binding, a human user has to complete a considerable number of troublesome operations, and such a process is time-consuming and error-prone. For example, a traditional manual binding might cause miss-configuration or neglect of some parameters. In contrast, according to embodiments of the present invention, these problems are overcome through automatically creating a binding, such that when the binding between the application and service is realized efficiently and fast, potential error that might occur during this process can be reduced.

Specifically, according to embodiments of the present invention, creating a binding between the application and the server at least comprises generating, in association with the application, a profile for the service. For example, the profile for the service may be generated and saved in a project for the application, thereby indicating an association relationship between the application and the server. According to embodiments of the present invention, the profile may comprise various information of a service, for example, service name, version, type, and the like.

In particular, according to some embodiments, a profile for the service may include at least one parameter associated with the service, wherein values of these parameters cannot be determined in the development, but vary with different environments. In other words, for each of these parameters, its specific value will dynamically vary with different environments where the application is located. According to embodiments of the present invention, these parameters would be automatically instantiated based on specific environments in which the application runs. It should be noted that the term "instantiate" used here refers to determining a value of a parameter according to a specific environment.

According to embodiments of the present invention, a parameter to be instantiated may be designated in the profile in any appropriate manner. For example, in an embodiment of compiling the profile with an edit language JSON (JavaScript Object Notation), a dedicated tag may be designed and implemented such that a parameter within the tag is interpreted as a parameter to be instantiated. As an example, an exemplary profile is shown below:

```
{
 "id": "Derby v10.8",
 "category": "Cloud",
 "subcategory": "RELATIONAL",
 "version": "10.8.3.0",
 "vendor": "IBM",
 "plan": "free",
 "hostPlatform": "Linux",
 "description": "open source relational database implemented entirely in Java",
 "label": "Apache Derby database network server",
 "libraries": [
  "compile": [
   "file://<shared_lib>/derby/derby-client.jar"
  ],
  "provided": [...]
 ],
 "instances": [{
  "name": "mydb",
  "credentials": {
        "dbname": "<name>",
        "host": "<host>",
        "port": "<port>",
        "user": "<username>",
        "password": "<password>"
  }}
}
```

In the above exemplary profile, various parameters included within a block defined by the tag "credentials" are to-be-instantiated parameters. For example, the value of the parameter "dbname" (database name) is set as "<name>," which indicates that the database name needs to be instantiated according to the specific environment where the application runs. Similarly, parameters "host," "port," "user," and "password" are all to-be-instantiated parameters.

Alternatively or additionally, any other appropriate manner may be adopted to create a file and formulate to-be-instantiated parameters, rather than being limited to the JSON file format. For example, various other formats such as database table, XML file, text file may be employed, and various appropriate means matching the file format may also be employed to specify the parameters to be instantiated. The scope of the present invention is not limited in this regard.

It can be appreciated that according to embodiments of the present invention, parameters associated with the service need no manual input from a developing, testing and/or deploying staff. Instead, by generating and using the above service profile, values of these parameters may be dynamically generated and injected according to specific developing, testing, and/or deploying environment. In this way, a binding between an application and a service may be implemented in a manner transparent to the user. More specifically, after the developer completes development of an application, a downstream tester and/or deployer needs no manual modification and adjustment to an application configuration based on his own particular environment and platform like in the traditional mode. To the contrary, according to embodiments of the present invention, an adaptive environment-specific configuration of the application would be efficiently, accurately, and automatically implemented through automatic value assignment and injection of parameters based on the profile of the application. In this way, the efficiency of application test and deployment is significantly improved, error risk is lowered, and time and human cost is saved.

Next, according to some optional embodiments of the present invention, at step S203, at least one of a file and an ancillary application for the application may be automatically imported. The term "file" as used herein includes any files associated with the application, for example, including, but not limited to, one or more of the following: document, library, head file, dynamic link library, and so forth. The term "ancillary application" as used herein refers to any other application needed for supporting running of the application, for example, including, but not limited to, a drive program, etc. For example if the application is a Java Web project, the corresponding library, such as a class library, may be automatically added into a catalogue associated with the application. Similar to generating a profile for a service as depicted above, all ancillary files and/or programs associated with the service may be imported in a user-transparent manner, improving the operation efficiency and reducing the load of the developer.

Next, the method 200 may proceed to step S204, where the application is configured at least partially based on the generated service profile. It should be noted that the profile-based application configuration may also be implemented by other parties. In fact, the operation may be implemented by the application itself. Therefore, step S204 is optional in the method 200. Configuring the application at step S204 may comprise, for example, creating, modifying and/or updating settings of the application, such that the application may access services. For example, if a Java Web application is bound to a database server, the configuration file (for example, web.xml) of the application may be modified here to set a corresponding data source such that the application has a path to access database service. According to embodiments of the present invention, the configuration performed at the step S204 is an initial configuration, and at this point, many parameters of the service have not been specifically instantiated yet. Afterwards, each time when the application is migrated to a new environment, a corresponding configuration will be performed to the application. It would be appreciated that such configuration can be regarded as a reconfiguration of the application with respect to the configuration at the development stage, which will be described in detail below.

Figure 3:
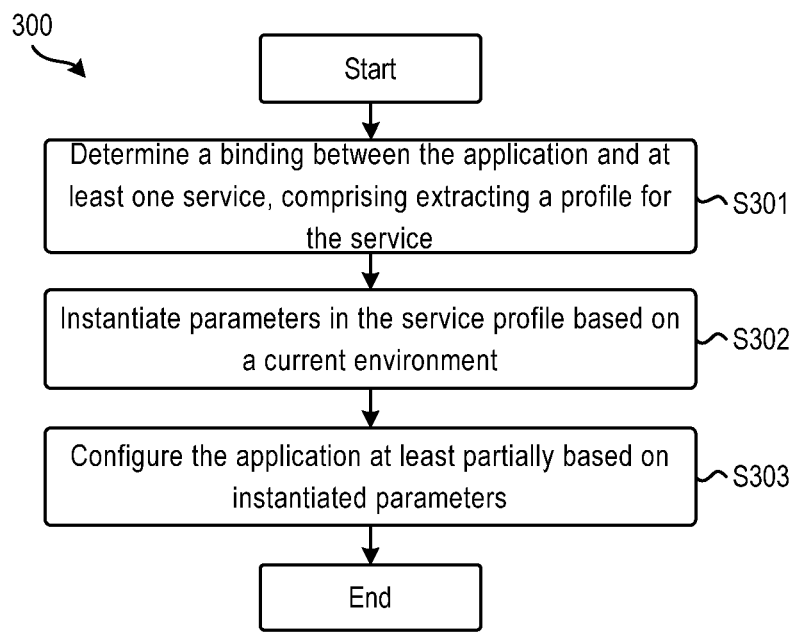
FIG. 3 shows an exemplary flow chart of a method for configuring an application according to embodiments of the present invention.

FIG. 3 shows a flow chart of a method 300 for configuring an application according to exemplary embodiments of the present invention. The method 300 may be executed upon testing and/or deploying an application so as to automatically configure the application according to different environments.

Specifically, after method 300 starts, binding between the application and at least one service is determined at step S301. As mentioned above, according to embodiments of the present invention, for each service associated with the applications, a profile for the service is generated in association with the application. For example, the profile is contained in a file package for the application. Accordingly, the profile may be extracted from the file package for the application to be deployed, and the binding relationship between the application and the service may be determined based on the profile. As mentioned above, according to embodiments of the present invention, a service profile may include at least one parameter which is associated with the service and which is to be instantiated.

The method 300 then proceeds to step S302, where at least one parameter in the profile is automatically instantiated based on the environment in which the application runs. It should be noted that according to embodiments of the present invention, the "environment" as used herein may refer to an environment for testing the application or a target environment for deployment. Moreover, according to embodiments of the present invention, the environment may be a local environment or a remote environment (e.g., cloud position in cloud computation).

According to embodiments of the present invention, dynamic instantiation of parameters may be implemented according in various manners. For example, in some embodiments, information related to the service may be collected based on the environment in which the application runs, for example, the specific location of the data source, the host IP address, port number, and the like. Then the collected information may be dynamically injected into runtime of the application to instantiate the relevant parameters in the profile. Alternatively, instead of dynamically collecting information associated with the service, such information may be periodically collected and stored in the target environment. In some other embodiments, according to an agreement between the developer and deployer, values of some parameters to be instantiated may be acquired and stored in advance. The scope of the present invention is not limited in this regard.

Furthermore, according to embodiments of the present invention, instantiation of parameters as indicated in the profile may be done by various technical means. In other words, values of parameters that are derived by analyzing the environment information may be passed to the application in various manners. For example, in some embodiments, the derived parameter values may be written into a configuration file accessible to the application runtime, thereby being injected into the application runtime. Alternatively or additionally, it is possible to pass the parameter values to the application by means of environment variables, registry, inter-process communication, and the like, thereby achieving the instantiation of the parameters.

Next, the method 300 proceeds to step S303, where the application is configured at least partially based on the instantiated parameters. At this point, since the parameters in the profile have been instantiated, settings of the application may be modified with the values of the instantiated parameters (for example, filling in the configuration file of the application), such that the application is able to correctly access the service when running in the current environment. A reconfiguration of the application may be implemented here with respect to the configuration during the development stage. In this way, reliance on manual operation due to environment heterogeneity during the procedures of application development, test and deployment may be effectively eliminated, which thereby reduces the error risks and improves the operation efficiency.

Moreover, in this way, late binding between the application and service is realized. Specifically, the service instance is dynamically injected into the application runtime, instead of being fixed by hard code or other manners in the source code. Therefore, the application may be dynamically deployed to any environment without changing the code of the application. This can significantly improve the efficiency and accuracy of application deployment, reduce the cost, and enhance the flexibility and adaptability of application development and deployment.

It would be appreciated that the execution sequences in the methods as depicted above with reference to FIGS. 2 and 3 are not limited to the sequences as shown in the figures. On the contrary, the steps in methods 200 and 300 may be executed in any appropriate sequence. For example, in method 200, generating a profile (step S202) and importing a file and/or ancillary application (step S203) may be executed in any sequence or even in parallel. For example, importing a file and/ancillary application (step S203) and configuring the application based on the profile (step S204) may be likewise executed according to any sequence or even in parallel, and so on. The scope of the present invention is not limited in this regard.

Now, a specific instance of implementing methods 200 and 300 is considered. As mentioned above, in some embodiments, an application developer or any other party may register a service in a service catalogue. For example, an Apache Derby database service may be registered in a cloud service catalogue. To this end, service metadata describing information such as name, version, class, mirror, client base, interface, document, connection configuration and exemplary code is submitted to the server. The metadata is stored in the server, and the cloud service catalogue is correspondingly refreshed.

Next, for example, when developing a Java Web application, a developer may search and select the above mentioned registered Derby database service from the service catalogue through IDE, and bind it to the Java Web application for example through drag-and-drop. Accordingly, the service profile for the Derby database service is generated in association with the Java Web application. For example, a corresponding profile file is generated in a project structure of the application. Some contents of a service profile are illustrated below.

```
{"derby-10.8":[{
    "name":"mydb",
        "label":"Derby v10.8",
        "plan":"free",
    "tags": ["derby", "derby-10.8", "relational"],
    "credentials":{
            "name":"<dbname>",
            "host":"<host>",
            "hostname":"<hostname>",
            "port":<port>,
            "username":"<username>",
            "password":"<password>"
        }
    }
}
```

Next, optionally, all required files or ancillary applications (for example, library, drive program, and the like) at the client end may be imported based on a service need. Thereafter, for a development environment for the application, the application may be configured at least partially based on the generated profile. For example, in this instance, the web.xml file of the Java Web application may be modified to create a new data source, thereby instantiating the parameters in the profile. In this way, the application may access the database using the file.

Accordingly, when testing or deploying the application, "late binding" may be used to inject an instance of the service to the Java Web runtime. Specifically, when deploying the application into a local environment or a remote cloud environment, the deployment structure of the application may be determined based on the application and the service. If necessary, an instance and/or resource of the service may also be created. Afterwards, information related to the service may be collected in the target environment, and a to-be-instantiated parameter as defined in the service profile may be instantiated based on the collected variant. Some contents of the service profile after the parameters are instantiated are shown below.

```
{"derby-10.8":[{
    "name":"mydb",
        "label":"Derby v10.8",
        "plan":"free",
    "tags": ["derby", "derby-10.8", "relational"],
    "credentials":{
            "name":"ICAPDB",
            "host":"127.0.0.1",
            "hostname":"localhost",
            "port":50000,
            "username":"icap",
            "password":"*************"
        }
    }
}
```

Next, the application is reconfigured based on the instantiated parameters. For example, in this example, the server.xml file of the Java Web application server may be modified so as to update configuration of the application. An example of the updated configuration file is shown hereinafter. It may be seen that the values of the instantiated parameters in the profile are now filled in the configuration file of the application server. In this way, the application may correctly invoke and access the services at runtime. Through the above action, the application may be efficiently deployed on the Java Web runtime of the target environment, and the whole deployment process needs no intervening of manual operations.

```
<jdbcDriver id="myJDBCDriver">
<library id="DerbyLib">
<fileset dir="${shared.resource.dir}" includes="derby.jar, derbynet.jar"/>
</library>
</jdbcDriver>
<dataSource id="derbyConnection" jdbcDriverRef="myJDBCDriver"
jndiName="jdbc/derbyConnection">
<properties.derby.client databaseName="ICAPDB"
createDatabase="create" serverName="9.125.1.1" portNumber="50000"/>
</dataSource>
```

Figure 4:
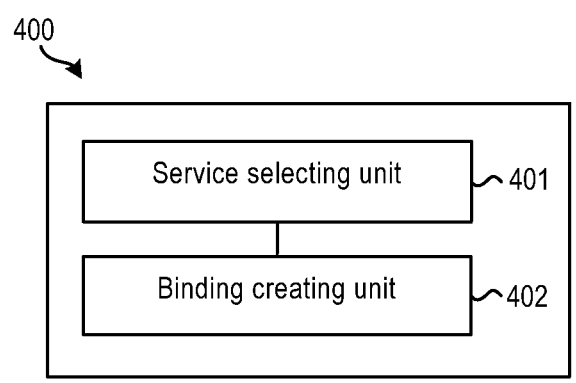
FIG. 4 shows an exemplary block diagram of an apparatus for developing an application according to embodiments of the present invention.

FIG. 4 shows a block diagram of an apparatus 400 for developing an application according to embodiments of the present invention. As shown in the figure, the apparatus 400 comprises: a service selection unit 401 configured to select at least one service associated with the application; and a binding creating unit 402 configured to create a binding between the application and the at least one service. In particular, the binding creating unit 402 is at least configured to generate, in association with the application, a profile for the at least one service, the profile containing at least one parameter associated with the service, the at least one parameter to be automatically instantiated based on an environment in which the application runs.

According to some embodiments of the present invention, the apparatus 400 may also comprise an importing unit configured to automatically import at least one of a file and an ancillary application of the application. Alternatively or additionally, according to some embodiments of the present invention, the apparatus 400 may also comprise: an application configuring unit configured to configure the application at least partially based on the profile. Additionally, according to some embodiments of the present invention, the at least one service is registered in a predefined service catalogue. In such an embodiment, the apparatus 400 may also comprise: a service browsing unit configured to display at least a portion of metadata for the at least one service, the metadata describing information associated with the at least one service.

Figure 5:
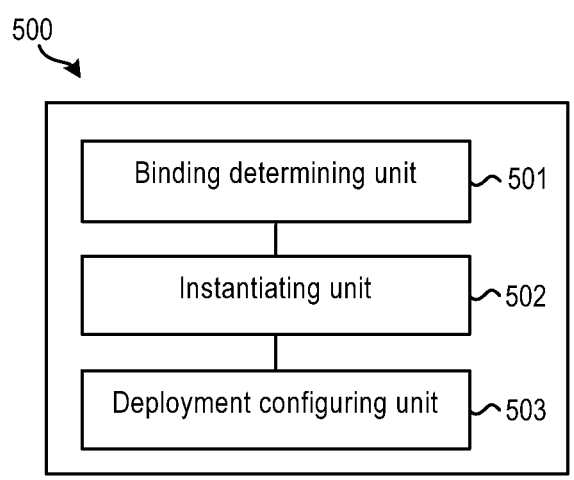
FIG. 5 shows an exemplary block diagram of an application for configuring an application according to embodiments of the present invention.

Now refer to FIG. 5, which shows a block diagram of an apparatus 500 for configuring an application according to embodiments of the present invention. As shown in the figure, according to embodiments of the present invention, the apparatus 500 comprises: a binding determining unit 501 configured to determine a binding between the application and at least one service, the determining at least comprising extracting a profile for the at least one service, the profile at least containing at least one parameter to be instantiated that is associated with the service; an instantiating unit 502 configured to automatically instantiate the at least one parameter in the profile based on an environment in which the application runs; and a deployment configuring unit 503 configured to configure the application based on the instantiated at least one parameter.

According to some embodiments of the present invention, the instantiating unit 502 may comprise: an information collecting unit configured to collect information associated with the service in the environment; and an injection unit configured to inject the collected information into runtime of the application so as to instantiate the at least one parameter in the profile. Alternatively or additionally, the instantiating unit 502 may be configured to the instantiated at least one parameter to the application using at least one of an environment variable, a configuration file, and a registry. Moreover, as indicated above, the environment may be a testing environment or a deployment target environment for the application. Moreover, the environment may be a local environment or a remote environment.

For the sake of clarity, FIGS. 4-5 do not show alternative units or sub-units comprised in the apparatus. However, it should be understood that all features and operations as depicted above are suitable to apparatuses 400-500, respectively, which are therefore not detailed here. Moreover, the partitioning of the units or subunits in respective apparatuses are not limiting, but exemplary, intended to describe their major functions or operations logically. Functions of one unit may be implemented by multiple units; in turn, multiple units may also be implemented by one unit. The scope of the present invention is not limited in this regard. Moreover, the units comprised in the apparatuses 400 and 500 as depicted above may be implemented in various manners, including software, hardware, firmware, or any combination thereof.

In order to solve the above and other potential problems, the present invention provides a method and apparatus for developing, testing, and deploying an application.

According to a first aspect of the present invention, a computer-implemented method for developing an application is provided. The method comprises: selecting at least one service associated with the application; and creating a binding between the application and the at least one service, the creating at least comprising generating, in association with the application, a profile for the at least one service, the profile containing at least one parameter associated with the service, the at least one parameter to be automatically instantiated based on an environment in which the application runs.

According to another aspect of the present invention, a computer-implemented method for configuring an application is provided. The method comprises: determining a binding between the application and at least one service, the determining at least comprising extracting a profile for the at least one service, the profile containing at least one parameter to be instantiated that is associated with the service; automatically instantiating the at least one parameter in the profile based on an environment in which the application runs; and configuring the application based on the instantiated at least one parameter.

According to yet another aspect of the present invention, an apparatus for developing an application is provided. The apparatus comprises: a service selecting unit configured to select at least one service associated with the application; and a binding creating unit configured to create a binding between the application and the at least one service, the creating at least comprising generating, in association with the application, a profile for the at least one service, the profile containing at least one parameter associated with the service, the at least one parameter to be automatically instantiated based on an environment in which the application runs.

According to still another aspect of the present invention, an apparatus for configuring an application is provided. The apparatus comprises: a binding determining unit configured to determine a binding between the application and at least one service, the determining at least comprising extracting a profile for the at least one service, the profile containing at least one parameter to be instantiated that is associated with the service; an instantiating unit configured to automatically instantiate the at least one parameter in the profile based on an environment in which the application runs; and a deployment configuring unit configured to configure the application based on the instantiated at least one parameter.

It would be appreciated through the following depiction that according to embodiments of the present invention, it is unnecessary to solidify a configuration and parameters of a service for example into a hard-coded or configured file. On the contrary, a profile of the service may be used to indicate parameters that need to be instantiated according to different environments. Then, when an application is migrated onto a new environment, information may be dynamically collected from the environment so as to instantiate the parameters of the service, and meanwhile configure, apply, and run the instance to complete deployment of the application. Under a large-scale environment (e.g., there are a considerable number of services, for example, more than 100 servers), the present invention may realize automated deployment in a better way. In this way, manual operations during the application development, test and/or deployment processes may be avoided, error risk may be lowered, efficiency may be enhanced, and flexibility of application development and deployment may also be improved.

The present disclosure relates to methods and apparatuses for developing, testing, and deploying applications. According to embodiments of the present invention, a binding between an application and a service may be automatically created. Specifically, a profile for the service may indicate that one or more parameters are to be instantiated. Accordingly, when the application runs on a specific environment, these parameters will be dynamically instantiated, and the application will be reconfigured. In this way, efficiency and accuracy during various stages of developing, testing, and deploying the application is effectively enhanced, and the flexibility is significantly improved. Methods and apparatuses for developing and configuring the application are disclosed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of developing an application, the method comprising:
   selecting, by one or more processors, a first service associated with an application, wherein the first service is invoked by the application;
   creating, by one or more processors, a binding between the application and the first service, said creating comprising generating, in association with the application, a profile for the first service, wherein the profile contains at least one parameter associated with the first service, and wherein the at least one parameter must be met in order to access the first service;
   automatically instantiating, by one or more processors, the at least one parameter associated with the first service based on a first computer environment in which the application runs, wherein the first computer environment is a development environment for developing the application, wherein automatically instantiating determines a value of the at least one parameter associated with the first service based on the first computer environment in which the application runs, and wherein automatically instantiating the at least one parameter in the profile based on an environment in which the application runs comprises:

collecting, by one or more processors, information associated with the first service in the environment; and injecting, by one or more processors, the collected information into a runtime of the application to instantiate the at least one parameter in the profile;

detecting, by one or more processors, that the environment in which the application is running changes from the first computer environment to a second computer environment, wherein the second computer environment is a deployment environment for deploying the application;

in response to detecting that the environment in which the application is running has changed from the first computer environment to the second computer environment, automatically instantiating at least one parameter for a second service;

in response to detecting that the environment in which the application is running has changed from the first computer environment to the second computer environment, changing, by one or more processors, an association with the application from the first service to the second service; and selectively deploying, by one or more processors, the application on either the second computer environment or a third computer environment based on the application and the second service, wherein the second computer environment is also a local environment, and wherein the third computer environment is a remote cloud environment.

2. The method according to claim 1, further comprising:
automatically importing, by one or more processors, at least one of a file associated with the application and an ancillary application for the application.

3. The method according to claim 1, further comprising:
configuring, by one or more processors, the application at least partially based on the profile.

4. The method according to claim 1, wherein the first service is registered in a predefined service catalogue, and wherein the method further comprises:

displaying, by one or more processors, at least a portion of metadata for the first service, wherein the metadata describes information associated with the first service.

5. The method according to claim 1, further comprising:
determining, by one or more processors, multiple services that may be used by the application;

displaying, on an electronic display, the multiple services that may be used by the application; and receiving, by one or more processors, a user selection of the first service from the multiple services for use with the application.

6. The method according to claim 1, wherein the first service is from a group consisting of a relation database, a memory, and a network service.

7. The method according to claim 1, wherein a first parameter for the first service when utilized by the application in the first computer environment is different from a second parameter for the second service when utilized by the application in the second computer environment.

8. The method according to claim 1, wherein the first service is a service that provides access to a database from a database server, and wherein the at least one parameter includes information required to access the database, and wherein the at least one parameter comprises a name of the database and a password required to access the database.

9. The method according to claim 1, wherein the at least one parameter associated with the first service varies according to the environment in which the application runs.

10. The method according to claim 1, further comprising:
in response to detecting that the environment in which the application is running has changed from the first computer environment to the second computer environment, modifying a configuration file in the application with an instantiated at least one parameter for the second service in order to enable the application to access the second service from the second computer environment.

11. The method according to claim 1, wherein the first computer environment is a single computer, and wherein the second computer environment is a cloud of computing devices.

12. A method for configuring an application, the method comprising:

determining, by one or more processors, a binding between an application and at least one service, wherein said determining comprises extracting a profile for the at least one service, wherein the profile contains at least one parameter to be instantiated that is associated with the at least one service, and wherein the at least one parameter must be met in order to access the at least one service;

automatically instantiating, by one or more processors, the at least one parameter in the profile based on an environment in which the application runs, wherein automatically instantiating determines a value of the at least one parameter based on the environment in which the application runs, and wherein automatically instantiating the at least one parameter in the profile based on the environment in which the application runs comprises:

collecting, by one or more processors, information associated with the at least one service in the environment; and injecting, by one or more processors, the collected information into a runtime of the application to instantiate the at least one parameter in the profile;

configuring, by one or more processors, the application based on the instantiated at least one parameter;

detecting, by one or more processors, that an environment in which the application is running changes from a first computer environment to a second computer environment, wherein the first computer environment is a development environment for developing the application, and wherein the second computer environment is a test environment for testing the application;

in response to detecting that the environment in which the application is running has changed from the first computer environment to the second computer environment, changing, by one or more processors, an association with the application from a first service to a second service; and selectively deploying, by one or more processors, the application on either the second computer environment or a third computer environment based on the application and the second service, wherein the second computer environment is also a local environment, and wherein the third computer environment is a remote cloud environment.

13. The method according to claim 12, wherein automatically instantiating the at least one parameter in the profile based on an environment in which the application runs comprises:

passing, by one or more processors, the instantiated at least one parameter to the application using at least one of an environment variable, a configuration file, and a registry.

14. A computer system comprising one or more processors, one or more computer readable memories, one or more computer readable storage mediums, and program instructions stored on at least one of the one or more storage mediums for execution by at least one of the one or more processors via at least one of the one or more memories, the stored program instructions comprising:

program instructions to select at least one service associated with an application, wherein the at least one service is invoked by the application;

program instructions to create a binding between the application and the at least one service, said creating comprising generating, in association with the application, a profile for the at least one service, wherein the profile contains at least one parameter associated with the at least one service, and wherein the at least one parameter must be met in order to access the at least one service;

program instructions to automatically instantiate the at least one parameter in the at least one service based on an environment in which the application runs, wherein automatically instantiating the at least one parameter determines a value of the at least one parameter based on the environment in which the application runs, and wherein automatically instantiating the at least one parameter in the profile based on the environment in which the application runs comprises:

collecting information associated with the at least one service in the environment; and injecting the collected information into a runtime of the application to instantiate the at least one parameter in the profile;

program instructions to detect that the environment in which the application is running changes from a first computer environment to a second computer environment wherein the first computer environment is a development environment for developing the application, and wherein the second computer environment is a deployment environment for deploying the application;

program instructions to, in response to detecting that the environment in which the application is running has changed from the first computer environment to the second computer environment, change an association with the application from a first service to a second service; and program instructions to selectively deploy the application on either the second computer environment or a third computer environment based on the application and the second service, wherein the second computer environment is also a local environment, and wherein the third computer environment is a remote cloud environment.

15. The computer system according to claim 14, further comprising:

program instructions to automatically import at least one of a file associated with the application and an ancillary application for the application.

16. The computer system according to claim 14, further comprising:

program instructions to configure the application at least partially based on the profile.

17. The computer system according to claim 14, wherein the at least one service is registered in a predefined service catalogue, and wherein the computer system further comprises:

program instructions to display at least a portion of metadata for the at least one service, wherein the metadata describes information associated with the at least one service.

\* \* \* \* \*